United States Patent
Stange et al.

(10) Patent No.: US 9,958,661 B2
(45) Date of Patent: May 1, 2018

(54) APPARATUS FOR STRUCTURED ILLUMINATION OF A SPECIMEN

(71) Applicant: Perkinelmer Cellular Technologies Germany GmbH, Hamburg (DE)

(72) Inventors: Roland Stange, Hamburg (DE); Stefan Lüpke, Hamburg (DE)

(73) Assignee: Perkinelmer Cellular Technologies Germany GmbH, Hamburg (DE)

( * ) Notice: Subject to any disclaimer, the term of this patent is extended or adjusted under 35 U.S.C. 154(b) by 202 days.

(21) Appl. No.: 14/442,740

(22) PCT Filed: Oct. 18, 2013

(86) PCT No.: PCT/EP2013/071822
§ 371 (c)(1),
(2) Date: May 14, 2015

(87) PCT Pub. No.: WO2014/075868
PCT Pub. Date: May 22, 2014

(65) Prior Publication Data
US 2015/0301322 A1    Oct. 22, 2015

(30) Foreign Application Priority Data
Nov. 16, 2012 (EP) .................................. 12193071

(51) Int. Cl.
G02B 21/06 (2006.01)
G02B 21/00 (2006.01)
G02B 21/36 (2006.01)

(52) U.S. Cl.
CPC ......... G02B 21/06 (2013.01); G02B 21/0032 (2013.01); G02B 21/0044 (2013.01);
(Continued)

(58) Field of Classification Search
CPC .......................... G02B 21/06; G02B 21/0032; G02B 21/0044; G02B 21/361; G02B 21/365;
(Continued)

(56) References Cited

U.S. PATENT DOCUMENTS 3,770,338 A * 11/1973 Helmuth ................ G02B 21/06
                                                    313/111
5,381,197 A *  1/1995 Yoshida ................ G02B 27/18
                                                    348/E9.027

(Continued)

FOREIGN PATENT DOCUMENTS

DE    102007009551 B3    8/2008

*Primary Examiner* — Ricky Mack
*Assistant Examiner* — Kristina Deherrera
(74) *Attorney, Agent, or Firm* — The Webb Law Firm

(57) ABSTRACT

An apparatus for structured illumination of a specimen comprises an illumination device for generating illumination beams. The illumination beams are incident on a mask device. Openings provided in the mask device serve for generating a mask image. The mask image is imaged within the specimen with the aid of an objective. Detection beams generated by the specimen are captured by a detection device. For increasing the intensity of the observation beams entering the specimen, those beams which do not pass through the openings, are collected with the aid of a beam collector and guided back to the mask device.

16 Claims, 6 Drawing Sheets

(52) U.S. Cl.
CPC ......... *G02B 21/361* (2013.01); *G02B 21/365* (2013.01); *G02B 21/367* (2013.01); *G02B 21/0076* (2013.01)

(58) Field of Classification Search
CPC . G02B 21/367; G02B 21/0076; G02B 21/082
USPC .................................................. 359/385–390
See application file for complete search history.

(56) References Cited

U.S. PATENT DOCUMENTS

| | | | |
|---|---|---|---|
| 5,601,733 A | 2/1997 | Partlo | |
| 5,999,247 A | 12/1999 | Tezuka | |
| 2002/0097485 A1* | 7/2002 | Aoshima | G02B 21/0048 359/368 |
| 2002/0190922 A1 | 12/2002 | Tsao | |
| 2008/0218849 A1* | 9/2008 | Uhl | G02B 21/0044 359/368 |
| 2012/0262711 A1* | 10/2012 | Oda | G01N 21/31 356/300 |

* cited by examiner

APPARATUS FOR STRUCTURED ILLUMINATION OF A SPECIMEN

CROSS-REFERENCE TO RELATED APPLICATIONS

This application is the United States national phase of International Application No. PCT/EP2013/071822 filed Oct. 18, 2013, and claims priority to European Patent Application No. 12193071.3 filed Nov. 16, 2012, the disclosures of which are hereby incorporated in their entirety by reference.

BACKGROUND OF THE INVENTION

Field of the Invention

The present invention relates to an apparatus for structured illumination, and in particular for confocal observation of a specimen, wherein the specimen particularly comprises biological and/or chemical substances.

Description of Related Art

Known structured illumination microscopes comprise an illumination device which can be e.g. a laser. With the aid of the illumination device, an illumination beam is generated which first will be incident onto a mask which can comprise a plurality of openings, which may be shaped e.g. as slots or pinholes. Via an objective device, the mask will be imaged in the specimen. In this process, an image of the mask is generated in a clearly defined plane of the specimen. The illumination beam causes a reaction in the specimen, thus generating detection beams. Said reaction can be e.g. a fluorescence excitation of markers included in the specimen, or also a simple reflection of the illumination beams. Several uses of structured illumination are known in the art, including the observation of transport processes, which is achieved by exciting or bleaching markers in particular regions of the sample, and then observing the spatial distribution of light emitted from the sample over a period of time, whereby the spatial distribution varies according to a movement of the markers in the specimen which is caused by transport processes under study. Another use of structured illumination is confocal observation of the sample, as detailed below.

To achieve confocal observation of the specimen, the detection beams emitted by the specimen will be returned, again via said objective device, to the mask and will pass through the corresponding openings of the mask. With the aid of a beam splitter device, the detection beams, after passing through the mask device, will be guided out of the optical path toward a detection device such as e.g. a CCD sensor. It is known in the art that this confocal arrangement of mask openings in both, the illumination and the detection path, will effectively suppress light originating from specimen regions outside the objective device's focal plane, providing the benefit of creating an optical slice through the sample.

When using mask devices with very small openings, the problem exists that only small amounts of illumination radiation will pass through the mask device and reach the specimen. A known approach to cope with this problem is the provision of microlenses upstream of the openings of the mask device, which microlenses will bundle the beams and resp. guide them toward the openings of the mask device. In this arrangement, the beam splitter device for outcoupling the detection beams is disposed between the mask device and said beam-bundling device, e.g. the lenses.

This known arrangement has several disadvantages and limitations. Precisely collimated light is required to be incident onto the microlenses, in order to ensure that the focus of each individual microlens is positioned exactly at the location of the corresponding mask opening, both in the lateral and axial directions. In practice, this requirement limits the choice of light sources to lasers, which are costly. Further, particularly in movable mask devices such as e.g. Nipkow disks, it is difficult to obtain precise alignment between the individual microlenses and the mask openings, and to ensure that this alignment is maintained during movement—e.g. rotation—of the mask device. In practice this means that, in spite of the use of microlenses for the bundling of rays, a part of the illumination beams will not pass through the openings of the mask device. As a consequence, the transillumination intensity entering the specimen, and thus also the intensity of the detection beams issuing from the specimen, will be reduced. This leads to a reduction of the information obtained when examining the specimen. Furthermore, since the microlenses need to move in synchrony with the mask device, the size of the microlens array is typically required to be much larger than the field of view, resulting in increased cost of the microlens array.

SUMMARY OF THE INVENTION

Finally, to use a combined microlens and mask device in a confocal arrangement and obtain a confocal image of the specimen, it is necessary to capture the detection beams returning from the specimen after they have returned through the mask device, but before they pass through the microlenses again, and to direct them toward the detection device. To this end, a beam splitter needs to be positioned between the microlenses and the mask device. The size of this beam splitter, and hence of the field of view observable in such an arrangement, is limited by the distance between the microlenses and the mask device. Since microlens focal lengths need to be small in order to obtain good focus quality on the mask device, this introduces a problematic limitation of the accessible field of view. Mechanical mounting of the beam splitter in the narrow available space presents a further technical challenge of the solution known in the art.

It is an object of the invention to provide an apparatus for structured illumination of a specimen wherein the intensity of the illumination radiation entering the specimen is improved.

The apparatus for structured illumination of a specimen comprises an illumination device for generating illumination beams. The illumination device preferably comprises one or a plurality of lasers or light-emitting diodes (LEDs). The illumination beams are incident on a mask device. With the aid of the mask device, a mask image will be generated in the specimen. Further, an objective device is provided for imaging the mask image in the specimen. The detection beams returning from the specimen will be detected by a detection device. Optionally, the detection device will be arranged so that the detection beams pass through the mask device before being guided towards the detection device, preferably via a beam splitter device arranged between the mask device and the detection device.

According to the invention, a beam collector is provided for improving the beam intensity in the specimen. With the aid of the beam collector, illumination beams which do not pass through the at least one opening into the mask device, will again be directed toward the mask device. Thus, the illumination beams will be collected and respectively deflected by the beam collector in such a manner that they will be incident on the mask device a plurality of times. Thereby, the intensity and respectively quantity of illumination beams passing through the openings—normally provided in a plural number—of the mask device is distinctly increased. A mask layer of the mask device onto which those illumination beams are incident which do not pass through the at least one opening, is planar and at least partially reflective. Thus, illumination beams not passing through the opening of the mask device will be reflected back from the mask layer of the mask device and reach the beam collector.

According to an exemplary embodiment, the beam collector comprises a reflecting surface, preferably a plurality of reflective surfaces. Optionally, the beam collector will again reflect the illumination beams a plurality of times and deflect them again toward the mask device.

Preferably, the beam collector comprises a preferably closed reflection chamber. The beam collector further comprises at least one entrance window, arranged e.g. in a entrance side, through which illumination beams will enter the beam collector. Illumination beams entering the beam collector via the at least one entrance window will then, with the aid of the beam collector, be guided toward the mask device, while those illumination beams which do not pass via the at least one opening of the mask device will be reflected within the beam collector preferably as many times as required to cause them to pass through the at least one opening of the mask device. In this manner, the intensity and respectively quantity of the illumination beams entering the specimen is considerably improved. At the most, it will be a very small quantity of illumination beams that does not pass through the at least one opening of the mask device. These are the illumination beams which will exit the beam collector again via the at least one entrance window or are lost due to imperfect reflection at the surfaces of the beam collector, mask device and potential other walls of the reflection chamber.

Thus, in the above described embodiment, the illumination radiation is fed into the beam collector so that all illumination beams which reach the specimen will pass through the beam collector. It could also be provided that only those beams which do not directly pass through the at least one opening of the mask device but are reflected from the mask layer of the mask device, will be allowed to enter the beam collector.

For feeding the illumination beams into the beam collector, a focusing lens is associated to the at least one entrance window. If a plurality of entrance windows are provided, it is preferred that each entrance window has a respective focusing lens provided for it. Since there will occur no relative movements between this focusing lens, the entrance window of the beam collector, and the illumination beams, a precise adjustment can be performed, thus safeguarding that the illumination beams will enter the beam collector substantially completely. This is in contrast to the challenges encountered in the confocal devices known in the art discussed earlier, which comprise a moving microlens array and mask device and are more difficult to align due to the scanning movement of the device relative to the illumination beam. Also, the entrance windows in the beam collector according to the invention can be made larger—at the expense of a slight increase in illumination losses—to relax the alignment tolerances. In contrast, the size of the openings in the mask device directly affects the spatial resolution of a confocal optical system, and is hence preferably made very small (close to the diffraction limit set by the preceding lens), creating very stringent alignment requirements.

To adapt the apparatus of the invention for confocal observation of the specimen, the detection beams emitted by the specimen will preferably pass through the at least one opening of the mask device and will then arrive at a beam splitter device. The beam splitter device will separate the illumination beams from the detection beams so that the detection beams will be deflected toward a detection device or will pass through the beam splitter device without deflection. In a corresponding manner, the illumination beams will be deflected by the beam splitter device or pass through the same. According to an exemplary embodiment, the beam splitter device is a part of the beam collector. In case of a beam collector defining a reflection chamber, the beam splitter device can form a side wall of the beam collector.

Alternatively, the detection beams can be directed towards the detection device through a detection mask, which is separate from the mask device, but has the same pattern of openings as the mask device.

It is preferred to scan the mask image across the specimen. Several technical solutions can be used for that purpose: The mask device itself can be mechanically moved, e.g. by periodic lateral translation or rotation. Alternatively, an optical scanning element—e.g. a moving deflection mirror or prism, or an acousto-optical deflector—can be disposed in between the mask device and the specimen. Finally, the specimen can be moved relative to the mask image, e.g. by mounting the specimen on a motorized translation stage.

Preferably, the mask layer of the mask device forms a further inner side of the reflection chamber. Herein, the inner side of the reflection chamber is preferably completely or at least partly reflective.

According to a further exemplary embodiment, the reflection chamber is at least partly formed by a glass body. In this case, the illumination beams within said glass body will be reflected on the outer surfaces of the glass body by total internal reflection, provided that the illumination beams impinge onto the outer surfaces at a certain angle and that the refractive index of the glass body is higher than that of the surrounding medium, e.g. air. Hence, a separate reflective coating of the outer surfaces of the glass body may not be needed. Alternatively it is possible to provide a reflective coating, e.g. a metal coating, on said outer surfaces in order to enhance the reflectivity or the allowable angular range of illumination beams impinging onto said surfaces.

Said at least one entrance window of the beam collector can be formed by an opening or also by a transparent region in the entrance side and respectively entrance wall of the beam collector. Preferably, the inner side of the entrance wall is reflective except for transparent regions. The transparent regions form the entrance windows. Concerning the entrance windows, irrespective of their design, it is of considerable advantage—for enhancing the effectiveness—to provide one focusing lens per entrance window. This focusing lens must be precisely adjusted toward the entrance window.

According to a further exemplary embodiment of the invention, reflection points are provided within the beam collector. Onto these reflection points, the illumination radiation will be focused, preferably with the aid of focusing lenses. A provision of small, precise entrance windows is not required in this embodiment. It is required to provide small, precise reflection points instead in order to minimize losses of illumination light. Since these reflection points are arranged within the beam collector, rather than on its surface as is the case for the entrance windows, the reflection points can be better protected from environmental hazards like dust or scratches.

According to a further exemplary embodiment, the incoupling of the illumination beams is performed in a glass rod which preferably is elongate. The cross section of the rod is preferably selected to match the shape and proportions of the field of view to be illuminated. For illumination of a sample to be imaged onto e.g. a CCD camera detection device, a rectangular cross section would therefore be preferred. The glass rod comprises an entrance window which has an entrance window corresponding to the beam collector. Substantially opposite to said entrance window, an exit surface is provided through which the illumination radiation will exit. Optionally, the exiting illumination radiation can then still be deflected toward the mask device. The mask layer of the mask device is preferably reflective again, so that the illumination radiation which does not pass through said at least one opening of the mask device will again enter the glass rod through the exit surface. Within the glass rod, this radiation will be reflected and, as far as not exiting via the entrance window, will exit again through the exit surface toward the mask device. The glass rod can form the beam collector or be provided in addition to the above described embodiment of a beam collector.

According to a further exemplary embodiment, it is possible to arrange the illumination device within the beam collector. This advantageously obviates the need to focus the illumination beam with the aid of focusing lenses toward an entrance window. Instead, the illumination beams are reflected within the beam collector until exiting via an exit opening toward the mask device. Corresponding to the above described embodiments, illumination radiation, as far as it does not pass through the at least one opening of the mask device, will remain in the beam collector.

Optionally, the mask device can be arranged directly in the exit opening. In this embodiment as well as in the above described embodiments, the reflection chamber can partly or fully spherical.

BRIEF DESCRIPTION OF THE DRAWINGS

Exemplary embodiments of the invention will be explained in greater detail hereunder with reference to the drawings.

DESCRIPTION OF THE INVENTION

Figure 2:
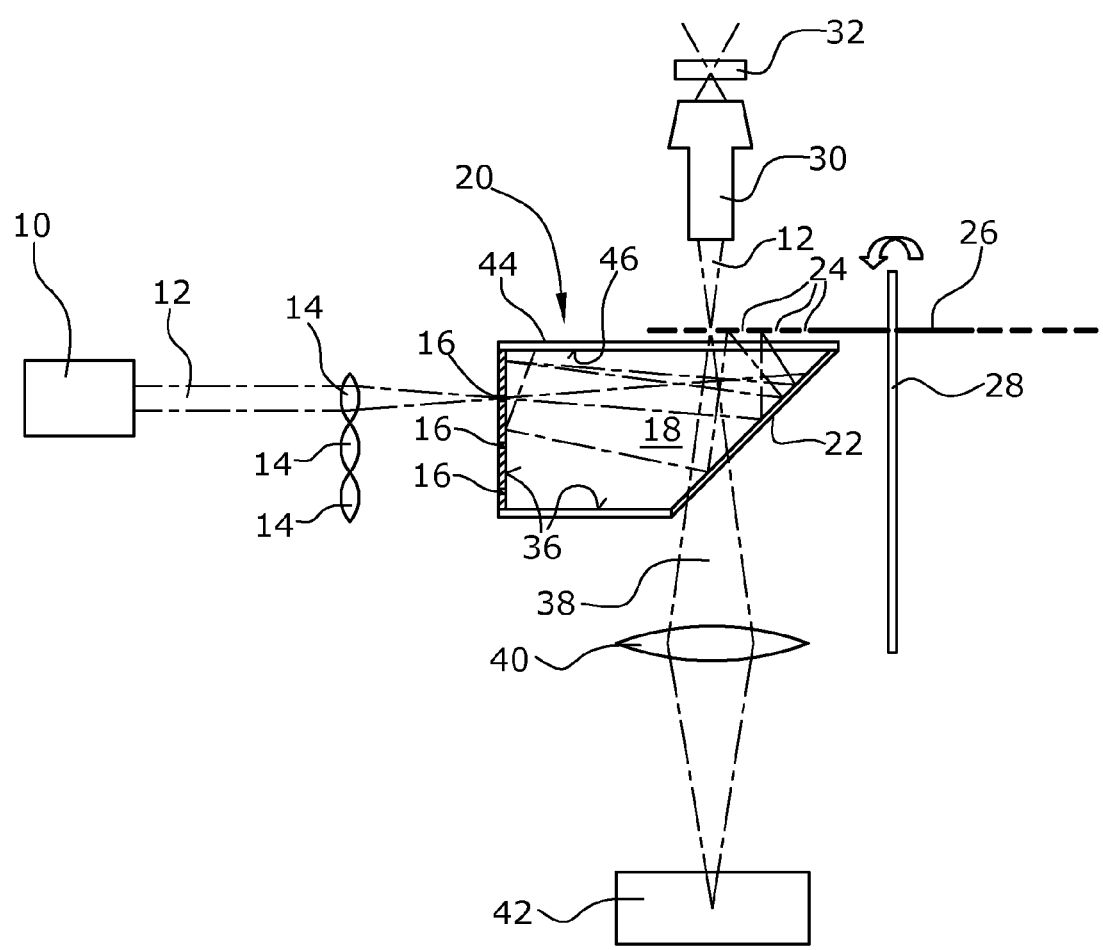
FIG. 2 is a schematic sectional view of the components essential for the apparatus according to a second embodiment of the invention.
Figure 3:
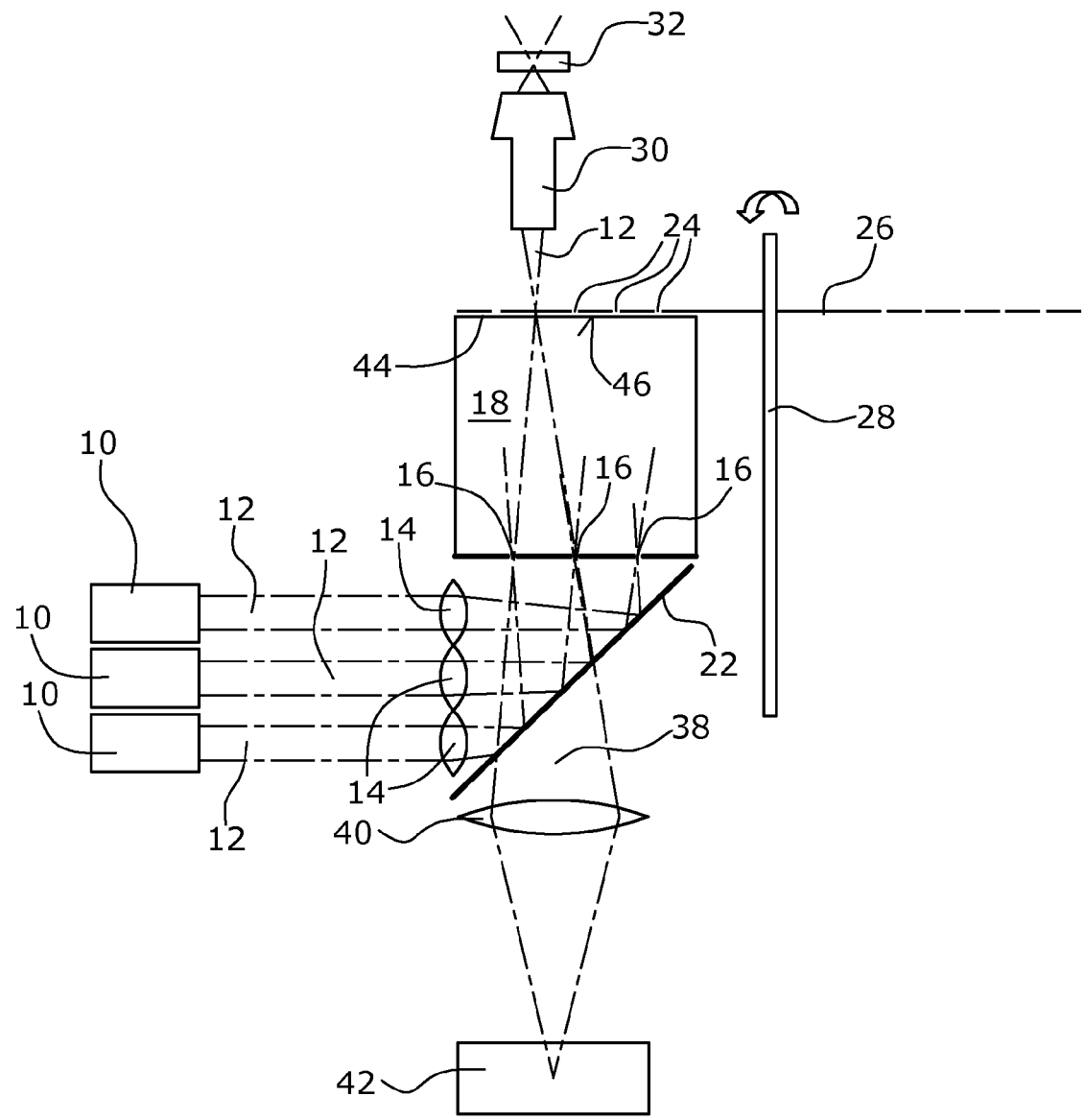
FIG. 3 is a schematic sectional view of the components essential for the apparatus according to a third embodiment of the invention.
Figure 4:
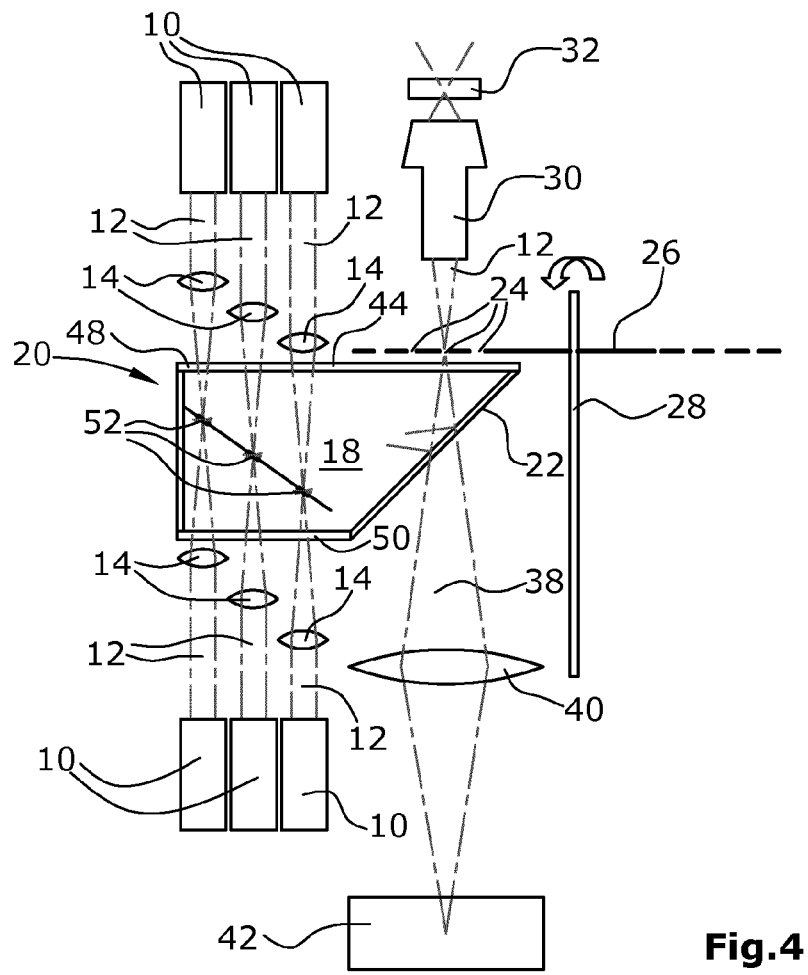
FIG. 4 is a schematic sectional view of the components essential for the apparatus according to a fourth embodiment of the invention.

In the examples presented below, alternative embodiments will be shown for various aspects of the invention:

(a) Illumination beams may be coupled into the beam collector via small entrance windows (FIGS. 1, 2), or via reflection points arranged within the beam collector (FIG. 3). One (FIG. 5) or a plurality (FIGS. 1, 2, 3) of such entrance windows or reflection points may be used.

(b) A reflective chamber may be realized as a hollow body with at least partially reflective inner walls (FIGS. 1, 2), specifically including a hollow sphere (FIG. 7), or as a glass rod (FIGS. 3, 5) either with mirrored walls or relying on total internal reflection.

(c) The mask device may be optically and mechanically coupled to the beam collector, and preferably the reflection chamber, in multiple ways. The mask device may be permanently attached to the reflection chamber, e.g. by providing the mirrored front surface of the reflection chamber with small openings. In order to scan the structured illumination pattern across the specimen, either the reflection chamber and the mask device can be mechanically moved together, or an optical scanning element—e.g. a moving deflection mirror or prism, or an acusto-optical deflector—can be disposed in between the mask device and the specimen. Also, the specimen itself can be moved relative to the illumination pattern, e.g. by mounting the specimen on a motorized translation stage.

Alternatively, the mask device may be arranged in close proximity, but separate from, the actual reflection chamber (FIGS. 1 to 4). In this case, the mask device can move independently from the reflection chamber, and can for example be formed as a spinning Nipkow disk for scanning the structured illumination across the specimen.

Figure 5:
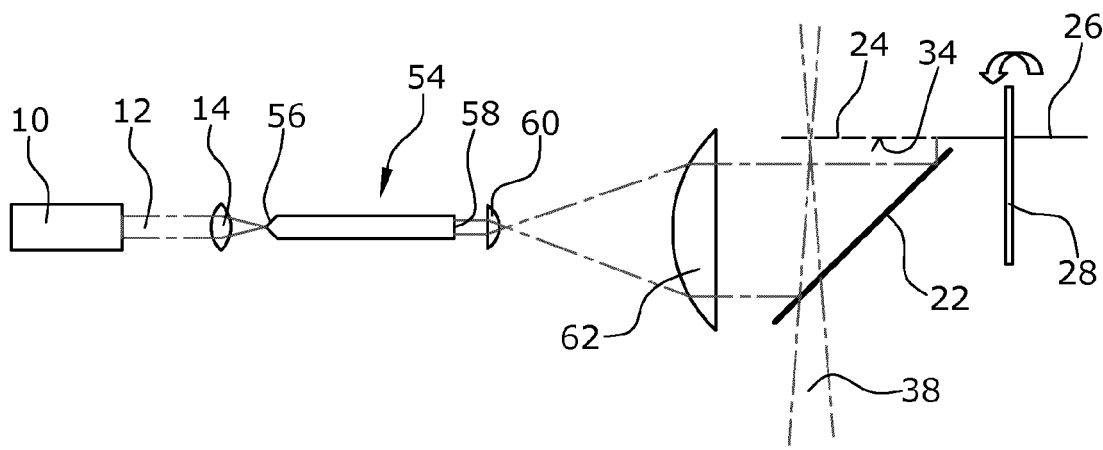
FIG. 5 is a schematic sectional view of the components essential for the apparatus according to a fifth embodiment of the invention.

Finally, the mask device may be spaced some distance away from the reflection chamber, and may be imaged onto a front surface of the reflection chamber using one or a plurality of lenses (FIG. 5).

Figure 7:
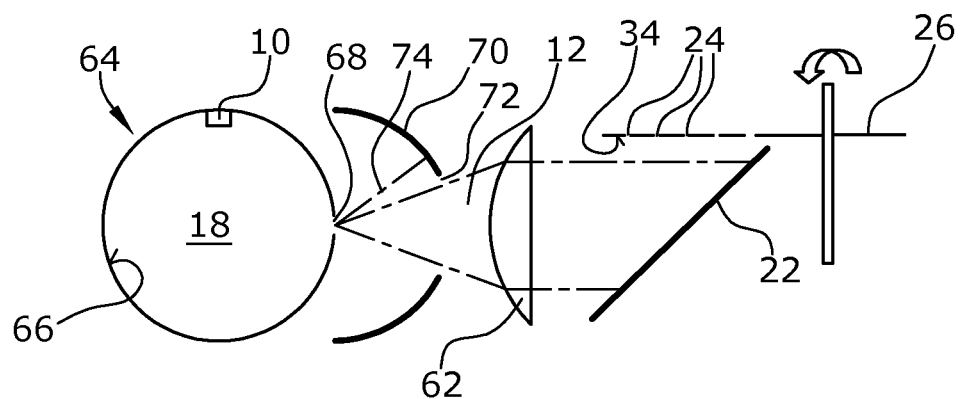
FIG. 7 is a schematic sectional view of the components essential for the apparatus according to a sixth embodiment of the invention.

(d) To arrange the apparatus of the invention for confocal observation of a specimen, various alternatives exist for directing the detection beams towards the detection device, after such beams have emerged from the specimen and passed the mask device. A beam splitter is used in all examples shown. If the detection beams comprise fluorescent light from the specimen, which has a wavelength different from the illumination light, said beam splitter is preferably a dichroic beam splitter. Such beam splitter can either be firmly attached to or inside the reflection chamber (FIGS. 1, 2, 4), can be placed in close proximity but separate from the reflection chamber, or can be spaced some distance away and imaged onto a surface of the reflection chamber using one or a plurality of lenses (FIGS. 5, 7).

A dichroic beam splitter can be used to separate detection from illumination beams in the spectral domain, and at the same time deflect one of the illumination or deflection beams in order to separate said beams spatially. Alternatively, the dichroic beam splitter can essentially be arranged at a right angle with the direction of the illumination and detection beams, providing essentially no spatial separation between these beams. This arrangement can advantageously be combined with a deflection of the illumination beams using reflection points (FIG. 3).

Figure 1:
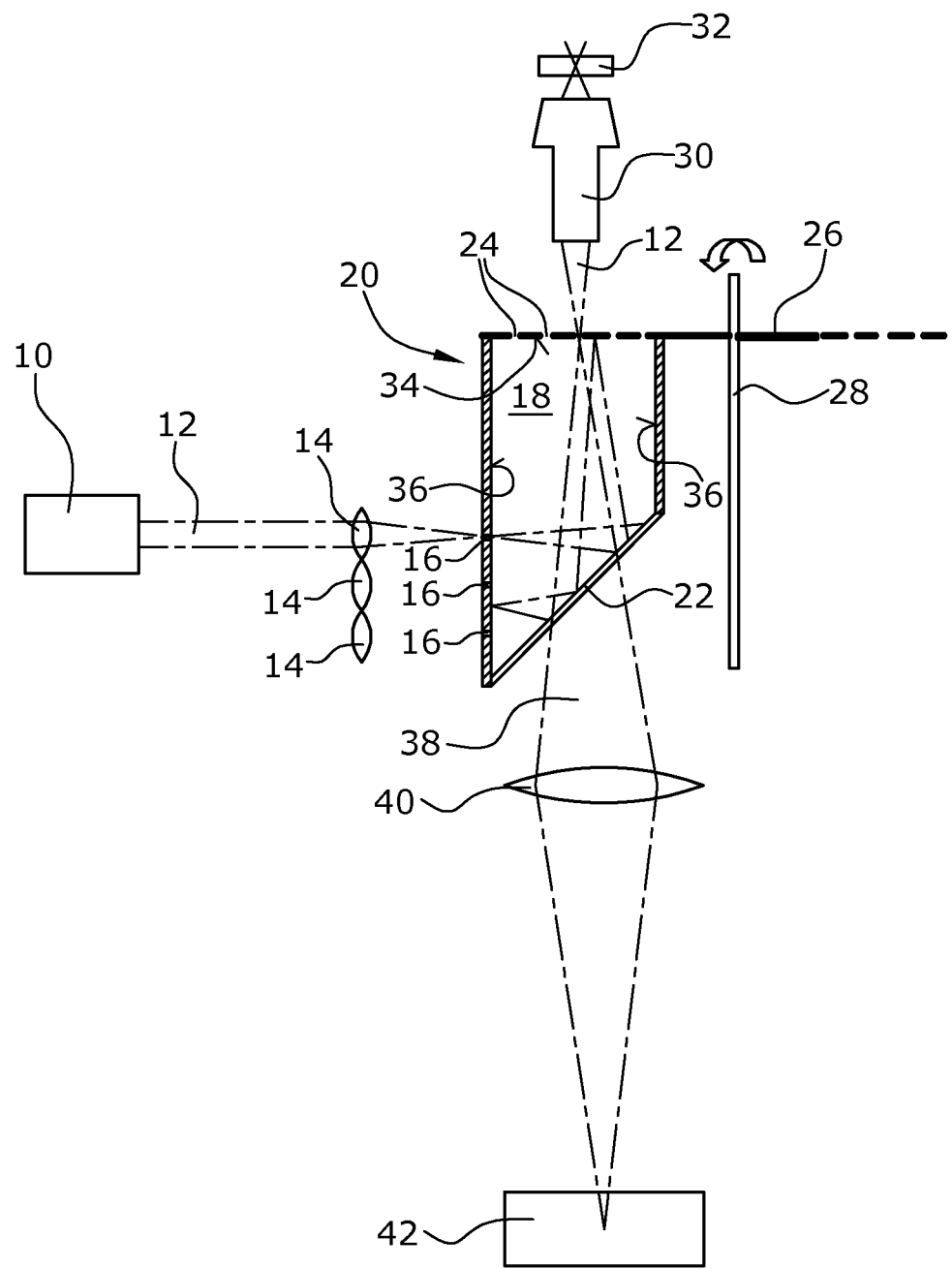
FIG. 1 is a schematic sectional view of a first embodiment of an apparatus according to the invention.

In the embodiment of the invention depicted in FIG. 1, an illumination device 10, such as e.g. a laser, generates illumination beams 12. The illumination beams 12 are incident on a focusing lens 14 and then, via an entrance window 16, will enter a reflection chamber 18 of a beam collector 20.

Optionally, a plurality of illumination devices 10 are provided, each of them generating illumination beams 12, wherein each illumination beam has a focusing lens 14 assigned to it and each focusing lens 14 has an entrance window 16 assigned to it.

After passing through the entrance window 16, the illumination beam will impinge on a beam splitter 22 and will be reflected by the latter in an upward direction according to FIG. 1. A part of the reflected beams will pass through openings 24 of a mask device 26 which in the illustrated embodiment is a Nipkow disk rotating about an axis 28. Illumination beams 12 exiting via said openings 24 will be focused, with the aid of an objective device 30, within a specimen 32.

Those beams which do not exit via one of said openings 24 will be reflected from an mask layer 34 of mask device 26 and remain in the reflection chamber 18 of beam collector 20. Since, preferably, also the inner sides 36 of beam collector 20 are reflective, there will occur a reflection, optionally a plurality of reflections, of these beams until these will then exit from the mask device 26 via one of the openings 24 toward the objective device 30.

Detection radiation generated in the specimen 32 will first travel, on the reverse path of the illumination radiation 12, through the objective device 30 and through the openings 24 of mask device 26 to the beam splitter 22. The detection beams 38 will pass through the latter and then, optionally with the aid of an intermediate lens 40, will be detected by a detection device 42.

In the further Figures depicting further embodiments, components similar or identical to those of FIG. 1 are designated with the same reference numerals.

In the embodiment shown in FIG. 2, the beam collector 20, in difference over the embodiment shown in FIG. 1, is not entirely below the mask device 26. The functions of beam collector 20 and the provision of reflective inner sides 36 therein correspond to the function illustrated in—and described with reference to—FIG. 1. Additionally, beam collector 20 comprises a further side wall 44 which is partly arranged below the mask device 26. The inner side 46 of side wall 44 is reflective at least in that region where it is not arranged below the mask device 26. In a region below the mask device 26, said inner side 46 can also be reflective e.g. for beams incident at a flat angle, since beams having a flat angle of incidence do not pass through the openings 24, or shall not pass therethrough because such beams would not reach the objective device 30.

In a further embodiment, shown in FIG. 3, the beam splitter 22 is not a part of the beam collector 20 but is arranged upstream the beam collector 20 when seen in the direction of the illumination beams 12. The illumination beams 12 are again focused by focusing lenses 14. In this embodiment, however, the illumination beams 12 will then be reflected at the beam splitter 22 and subsequently enter the reflection chamber 18 via the entrance windows 16.

In correspondence to the embodiment shown in FIG. 2, the beam collector 20 comprises an additional side wall 44. Also this side wall can be formed in a manner causing it to reflect radiation incident on said inner side 46 at a flat angle. Further, the side wall 44 can be formed as an optical filter for improving the homogeneity of the beams.

According to an exemplary embodiment (FIG. 4), the beam collector does not comprise entrance windows 16. Instead, the illumination beams 12 will enter the reflection chamber 18 e.g. via transparent regions in side walls 48,50.

Arranged within reflection chamber 18 are reflection points 52 onto which the illumination beams 12 are focused. By said reflection points 52, a reflection of the illumination radiation 12 occurs within the reflection chamber 18, which otherwise is designed as described above, until the beams will pass through the openings 24 of the mask device 26.

According to a further exemplary embodiment (FIG. 5), the beam collector is formed as an elongate cylindrical glass body 54. The illumination beam 12 will enter said glass body 54 at an entrance window 56. At an exit side 58, there will then exit a homogeneous beam which will be focused and respectively collimated via lenses 60,62 and then be guided via beam splitter 22 toward the openings 24 of mask device 26. Also the mask layer 34 of mask device 26 is reflective so that illumination radiation which does not pass through the openings 24 will be reflected back again and will be incoupled into the glass rod via—in reverse order—the beam splitter 22, the lenses 60,62 and the exit surface 58. Within the glass rod, the illumination beams 12 will be reflected until again exiting via exit surface 58 and being guided toward mask device 26.

Figure 6:
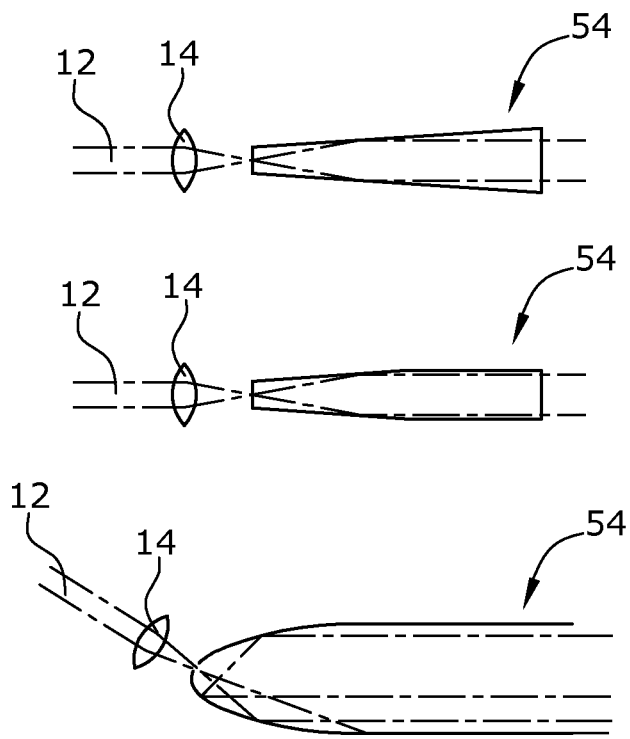
FIG. 6 shows schematic representations of the glass rods included in the embodiment illustrated in FIG. 5.

In this embodiment, the substantially cylindrical glass bodies 54 can be designed e.g. as shown in FIG. 6.

According to a further exemplary embodiment of the invention (FIG. 7), the beam collector is formed as a spherical body 64. Either said body 64 can comprise an entrance window as described above, or the illumination device can be arranged e.g. in the form of an LED within the beam collector 64. The inner surface 66 of the spherical body 64 is reflective and comprises an exit opening 68. Through this opening, illumination beams 12 are exiting which via lens 62 and beam splitter 22 will be guided toward mask device 26. Illumination radiation not passing through the openings 24 will be reflected at the mask layer 34 and, via beam splitter 22 and through lens 62 and exit opening 68, will enter the reflection chamber 18 again.

Further, a spherical mirror 70 with a passage opening 72 is provided. With the aid of the spherical mirror 70, the beams exiting from the exit opening 68 will be restricted with regard to their exit angle. A beam exiting e.g. in a direction 74 will be mirrored by the spherical mirror 70 via exit opening 68 back into the reflection chamber 18. Thereby, only those beams which can be used for illumination of the specimen 32 will be guided toward the mask device 26.

Figure 8:
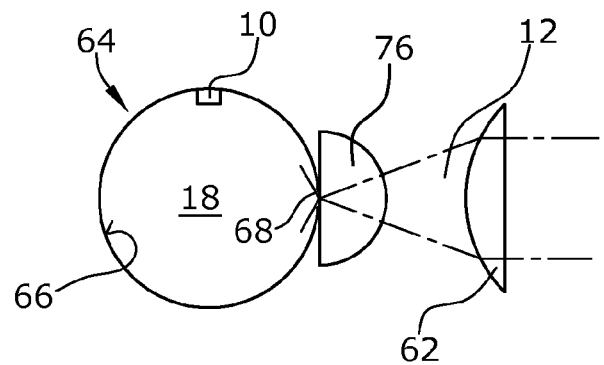
FIG. 8 is a schematic sectional view of the components essential for the apparatus according to a seventh embodiment of the invention.

As evident from the schematic representation in FIG. 8, the embodiment described with reference to FIG. 7 can also be modified to the effect that a semispherical lens 76 is arranged directly at the exit opening 68. In this manner, the spherical mirror 70 can be omitted.

Figure 9:
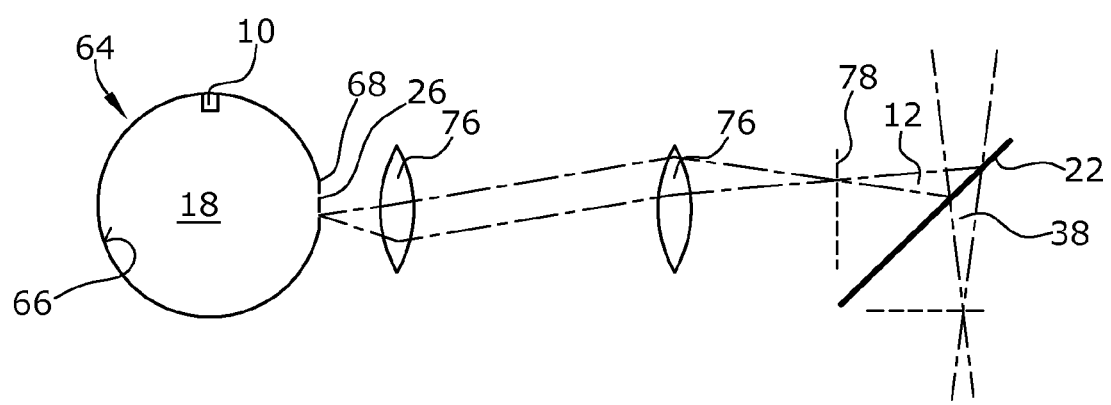
FIG. 9 is a schematic sectional view of the components essential for the apparatus according to an eighth embodiment of the invention.

In the embodiment described with reference to FIG. 7, it is further possible to arrange the mask device 26 directly in the exit opening 68 (FIG. 9). The mask image generated by the mask device 26 will then be converted, via lenses 76, into a virtual image 78. By the beam splitter 22, the illumination beams 12 will then be deflected toward the objective device 30 and be imaged within the specimen 32. Detection beams 38 will travel to the detector 42 via a scan mask 80.

The invention claimed is:

1. An apparatus for structured illumination of a specimen, comprising:
    an illumination device to generate illumination beams;
    a mask device illuminated by the illumination beams, said mask device being provided with openings to generate a mask image, and a mask layer of said mask device being planar and at least partially reflective;

an objective device to image said mask image in the specimen;

a detection device for detecting detection beams issuing from the specimen; and a beam splitter configured to reflect the illumination beams toward the specimen and to permit passage of the detection beams issuing from the specimen, or vice versa, wherein a beam collector by which those illumination beams which have not passed through an opening of the mask device are reflected from the mask layer of the mask device toward the beam collector and again guided toward the mask device; and the beam splitter comprises a wall of the beam collector, or the beam collector forms a reflection chamber with the mask layer of the mask device forming an inner side of the reflection chamber, or both.

2. The apparatus according to claim 1, wherein the detection beams pass through the mask device before being directed to the detection device in order to produce a confocal image of the specimen.

3. The apparatus according to claim 1, wherein the detection beams pass through a detection mask device having openings in the same pattern as the mask device before being directed to the detection device, in order to produce a confocal image of the specimen.

4. The apparatus according to claim 1, wherein the detection device is an image detection device providing at least one digital output signal, wherein the digital output signal is processed in such a way that only those detection beams are considered which have reached positions on the detection device through openings of the mask device.

5. The apparatus according to claim 1, wherein the beam collector comprises, in an entrance side, at least one entrance window for the illumination beams.

6. The apparatus according to claim 5, wherein said at least one entrance window of the beam collector is formed by a transparent region of an otherwise reflective side.

7. The apparatus according to claim 5, wherein the at least one entrance window is operatively aligned with at least one focusing lens.

8. The apparatus according to claim 7, further comprising at least one reflection point, arranged within the beam collector and spaced from surfaces of the beam collector, onto which the illumination beams from the at least one focusing lens are focused.

9. The apparatus according to claim 8, wherein the at least one reflection point is arranged within the reflection chamber.

10. The apparatus according to claim 5, wherein the illumination beams enter the reflection chamber through said at least one entrance window, the illumination beams exiting only toward the mask device.

11. The apparatus according to claim 10, wherein inner sides of the reflection chamber are at least partially reflective.

12. The apparatus according to claim 10, wherein the reflection chamber is at least partially formed by a glass body, the outer surface thereof functioning as a reflective surface.

13. The apparatus according to claim 10, wherein the mask layer of the mask device is imaged onto a side of the reflection chamber by at least one imaging lens.

14. The apparatus according to claim 10, wherein the reflection chamber is at least partially spherical.

15. The apparatus according to claim 1, wherein the illumination device is arranged within the beam collector.

16. The apparatus according to claim 1, wherein the beam collector comprises a glass rod having an entrance window and an exit surface substantially opposite thereto.

* * * * *